Figure 7:
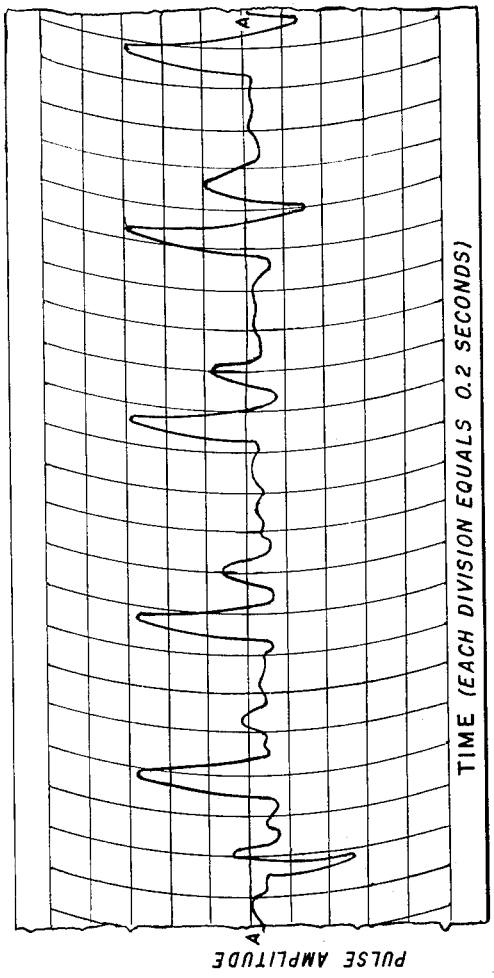

June 30, 1964  F. W. BOTSCH ETAL  3,139,086
HUMAN PULSE RATE MEASURING APPARATUS
Filed April 26, 1962                                                                 2 Sheets-Sheet 1
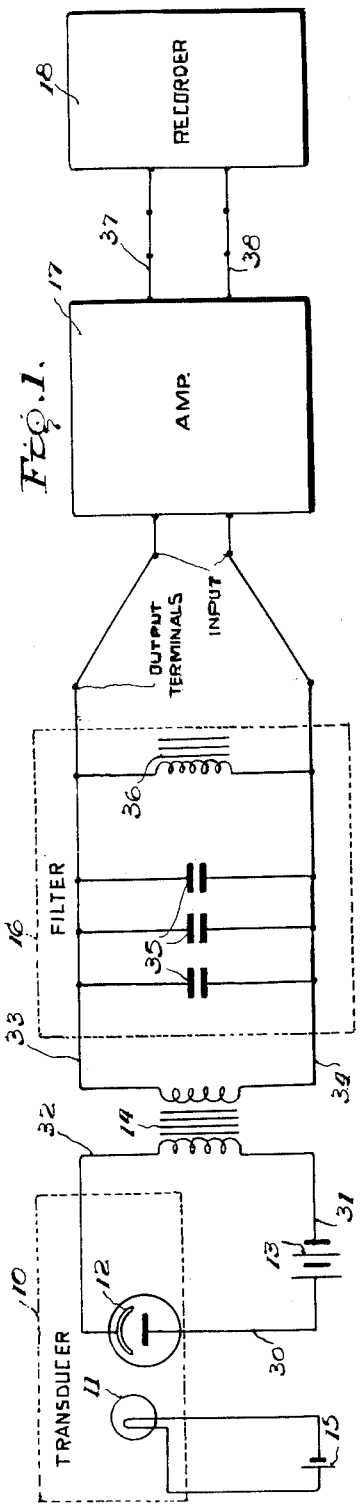
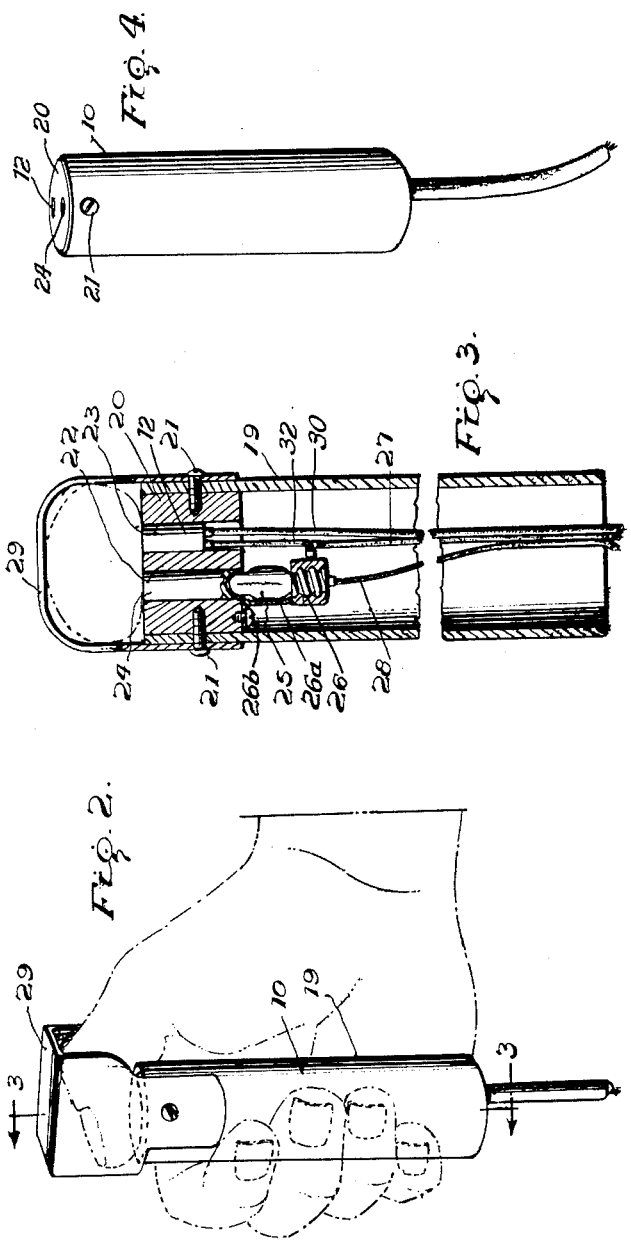
INVENTORS
*Francis. W. Botsch*
*Michael J. Sacco*

INVENTORS
*Francis W. Botsch*
*Michael J. Sacco*

United States Patent Office 3,139,086
Patented June 30, 1964

3,139,086
HUMAN PULSE RATE MEASURING APPARATUS
Francis W. Botsch, Framingham, and Michael J. Sacco, Shrewsbury, Mass., assignors to the United States of America as represented by the Secretary of the Army
Filed Apr. 26, 1962, Ser. No. 190,512
11 Claims. (Cl. 128—2.05)
(Granted under Title 35, U.S. Code (1952), sec. 266)

The invention described herein, if patented, may be manufactured and used by or for the Government for governmental purposes without payment to us of any royalty thereon.

This invention relates to an improved method and apparatus for the photoelectric measurement of changes in the light transmission characteristics of human or animal tissue through which blood is circulated. More particularly, the invention relates to an improved method and apparatus for the photoelectric measurement of pulse rate.

Pulse rate or frequency of heart beat is a classical criterion of the physiological condition of human and animal bodies. It is most widely known for its importance as a diagnostic tool. It is, however, also a particularly valuable indicator of physiological stress in scientific research with human and animal test subjects. It is especially valuable in this respect as an indicator to protect test subjects from excessive stress.

A number of methods are available for the measurement of pulse rate and other related physiological effects. These methods, while satisfactory for use with sedentary subjects, are entirely unsatisfactory when applied to active test subjects. Instruments which measure heart sounds, electrical potentials and peripheral pulse pressure are all extremely susceptible to interference from extraneous signals. When the subject is physically active, these extraneous signals are frequently more predominant than the pulse rate signal which is to be measured. The sound level in an experimental chamber or noises due to the movement of clothing are often greater than the sound of the heart beat. Spurious electrical potentials may be produced by near-by electrical equipment or by variations in muscle potentials. Pressure sensing devices which are necessarily very sensitive are affected by the motion of the test subject. Various means including elaborate harnesses and extensive pre-exercise instrumentation have been used in attempts to overcome these problems. However, such means are not only very inconvenient but in most instances also lack the required degree of reliability.

The present invention uses the photoelectric method of heart beat detection. This method is based upon the ability of a photoelectric cell to sense changes in the intensity of light transmitted through a vascular area. With every heart beat, there is an increase in the amount of blood in vascular portions of the body. Since the light transmission characteristics of tissue vary with the amount of blood in the tissue, the detection of changes in these characteristics provides an indication of heart beat from which pulse rate may be determined.

The photoelectric method of determining changes in the light transmission characteristics of tissue has been used in a plethysmograph for measuring blood volume and also in oxymeters for determining variations in the oxygen content of blood. These applications produce signals in much the same manner as the present invention but that portion of the signal which indicates pulse rate is requently overridden by signals resulting from changes in the amount of oxygen in the blood and other respiratory disturbances thereby making these devices unreliable as pulse rate indicators on active test subjects. In addition, these devices have utilized transducers which require attachment to the subject in some manner and thus require individual adjustment and attachment to each test subject.

It is, therefore, an important object of the present invention to provide a simple, highly reliable, non-ambiguous means for determining the pulse rate of active as well as sedentary subjects. It is a further object of this invention to provide a pulse rate measuring device for active subjects which requires no pre-exercise instrumentation. It is a further object of this invention to provide a pulse rate measuring device which can be used by a number of human subjects without requiring adjustment for size or individual characteristics such that it may be easily passed from one subject to another to check pulse rate during exercise. It is a further object of this invention to provide such a device which will not be affected by heat, sweat, or body motions. A still further important object of this invention is to provide an improved transducer for detecting variations in the light transmission characteristics of tissue through which blood is circulated. Still another important object of this invention is to provide an improved method for indicating the pulse beat of human and animal subjects.

Figure 6:
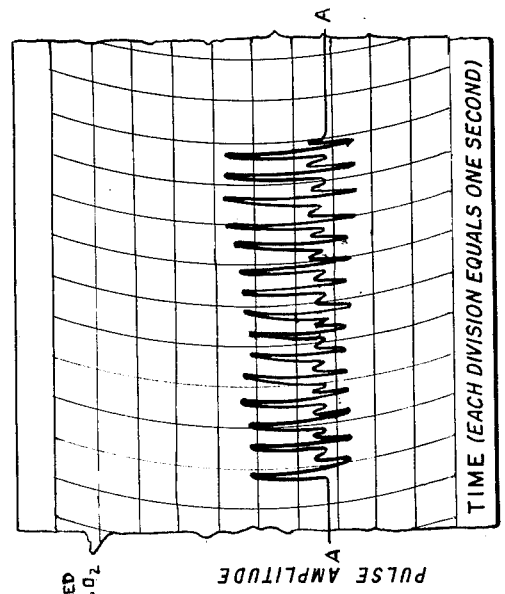
Figure 5:
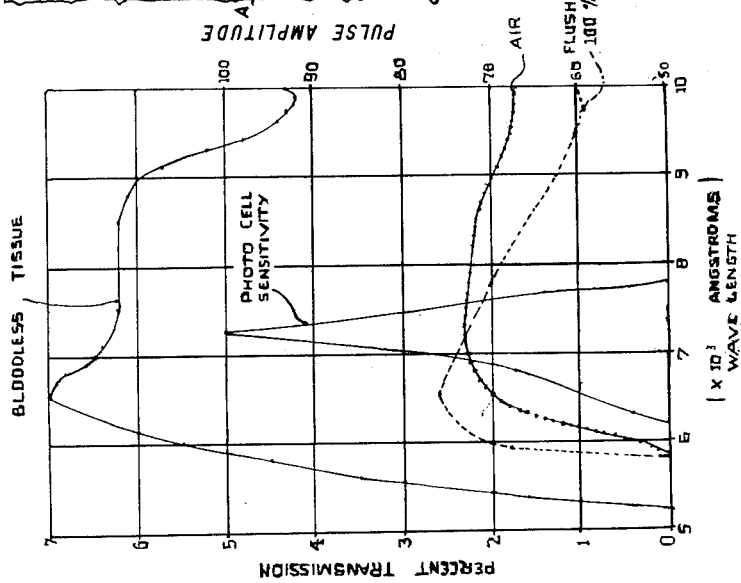

Other objects, capabilities and advantages of the invention will become apparent during the course of the following description wherein reference is made to the accompanying drawings forming a part of this application, in which like numerals are used to designate like parts throughout the same and in which: FIGURE 1 is a circuit diagram of the pulse rate measuring device of the present invention; FIGURE 2 is a perspective view of the transducer of the present invention held in the hand of a subject for pulse rate measurements; FIGURE 3 is a central vertical section taken along the line 3—3 of FIGURE 2; FIGURE 4 is a perspective view of the transducer with the hood removed; FIGURE 5 is a graph showing the light transmission characteristics of human tissue under various conditions; FIGURE 6 is a section of a chart record obtained by the use of the present invention and showing pulse beats of the test subject; and FIGURE 7 is a similar record made at a higher chart speed.

Before proceeding with a detailed description of the apparatus of the present invention it will be helpful to describe briefly the physiological phenomena upon which it is based. FIGURE 5 shows a graph of the light transmission characteristics of human tissue for different wave lengths of light. Values are plotted for percent transmission through bloodless tissue, for percent transmission through tissue flushed with blood of a subject breathing 100 percent oxygen and for percent transmission through tissue flushed with blood of a subject breathing air. It will be obvious by reference to this graph that substantial variations in the light transmission characteristics of tissue will occur with variations in the amount of oxygen inhaled by the subject and with variations in the average vascularity or total volume of blood in the tissue as well as the variation in quantity occurring with each heart beat. The latter is, of course, the indication of pulse rate which is to be measured by the invention. In addition to these variations in the light transmission characteristics of tissue, variations in the transmission characteristics of the blood itself are caused by changes in the ratio of oxyhaemoglobin concentration to hemoglobin concentration producing extreme light intensity changes from disturbances in the respiratory state of the test subject. The combined effect of these variations on the read-out of devices which satisfactorily measure pulse rate in sedentary individuals practically completely obliterates the pulse rate signal when the subject is engaged in exercise. Thus, as a subject exercises, his respiratory rate increases, average vascularity increases and the amount of oxygen or oxygenation of the blood increases, all causing substantial changes in the light transmission characteristics of his tissue in addition to the cyclic change due to the heart beat.

We have discovered that the effects of these variations can be substantially eliminated by a combination of means which we have embodied in the present invention. We have, for example, noted that the amount of oxygen in the subject's blood has little or no effect on the light transmission characteristics of the blood to light of a certain wave length, namely, from about 7,100 to about 7,500 angstroms. Thus, by selecting a photocell having its maximum sensitivity to light in this wave length range, we have effectively eliminated the variable resulting from oxygenation of the blood. On the other hand, changes in the average vascularity of the test subject result in continual shifting of the base line or reference point for our pulse rate measurements. Because these changes are gradual relative to variations due to pulse rate, we have eliminated them from our read-out by coupling our photocell to the amplifier-recorder circuit through an alternating current transformer such that only the transient or what may be considered the alternating current portion of the photocell signal is passed to an amplifier-recorder circuit. Finally, since the pulse rate signal in which we are interested occurs in human beings only at frequencies below 4 cycles per second, we have incorporated a filter circuit designed to filter signals having a frequency in excess of 4 or 5 cycles per second which will eliminate from our signal all extraneous values resulting from power line pick-up, noise associated with body motion and spurious ambient light fluctuations. Through a combination of these means we are able to obtain a noise-free signal which provides a non-ambiguous indication each time the subject's heart beats such that when this circuit is utilized in combination with the improved transducer of the present invention we are able to obtain a continuous measurement of pulse rate from vigorously exercising subjects.

Turning now to FIGURE 1 of the drawings, the illustrated embodiment of the present invention includes a transducer 10 which in turn embodies a lamp 11 and a photocell 12 arranged therein in a manner to be hereinafter described. The photocell 12 is connected in series with a power source 13 and the primary winding of an alternating current transformer 14. The lamp 11 is connected in series with a separate power source 15. The secondary of the transformer is connected through a band pass filter 16 to a conventional direct current amplifier 17. The amplifier output is fed to a conventional recorder 18 which produces an analog trace of the input signal on moving chart paper.

The illustrated embodiment of the transducer 10 of the present invention comprises a tubular member 19 sized to be conveniently grasped in a human hand as shown in FIGURE 2 of the drawings. An aluminum tube 1¼" in diameter, 4" long, having a 3/32" wall thickness has been found satisfactory for this purpose. One end of the tubular member 19 is closed by an opaque phenolic plug 20 approximately ¾" thick which is held in place by two screws 21. The plug 20 is provided with two round holes 22, 23 therethrough in a direction parallel to the longitudinal axis of the tubular member 19 and located so as to be completely covered by the thumb pad of a human hand when the thumb pad is placed over that end of the tubular member. A rod 24 of light-transmitting material such as Plexiglas or Lucite is mounted in one of the holes. The inner end of the rod 24 may be concave for a purpose to be described and the outer end is flush with the outer surface of the plug 20. A conventional type 22 bulb 25 and socket 26 are housed within the tubular member 19 mounted as best shown in FIGURE 3. The socket 26 is fixed to bracket 26a which, in turn, is mounted on the underside of plug 20 by screw 26b. The bulb 25 and socket 26 are positioned so that the surface of the bulb 25 engages in the concave end of the light-conducting rod 24. It should be noted that the invention will function quite adequately without the use of this rod 24 since bulb 25 may be positioned in such a manner that light therefrom will pass through one of the holes 22, 23 in the plug 20 to its outer surface even in the absence of rod 24. However, the use of the rod 24 increases the amount of light from bulb 25 reaching the outer surface of plug 20 and prevents heat produced by the bulb 25 from causing discomfort or affecting the vascularity of the thumb pad. The light bulb 25 is connected in series with the power source 15 comprising a 1.5 volt battery by flexible conductors 27 and 28.

A cadmium selenide photocell comprising the heretofore mentioned photocell 12 is mounted in the other hole in the phenolic plug 20 preferably flush with the outer surface thereof. The photocell 12 is mounted in such a manner that the photoelectric element therein is shielded from the direct light of bulb 25 so as to be responsive only to light admitted through hole 23. The photocell 12 is selected to provide a maximum response to light having a wave length near 7,500 angstroms. A Clairex type CL-3 photocell has been found satisfactory and FIGURE 5 shows the relative sensitivity of a cell of this type superimposed on the graph of the transmission characteristics of human tissue. It will be apparent from a study of FIGURE 5 that a photocell having peak responses between 7,100 and 7,500 angstroms will substantially completely eliminate the effect of changes in the light transmission characteristics of human tissue due to changes in the amount of oxygen in the blood.

The transducer 10 in the illustrated embodiment is preferably provided with an opaque hood 29 as shown in FIGURE 2. The hood 29 is shaped to inclose the entire end of the transducer 10 except for a space sufficient for the insertion of a human thumb. The hood 29 may be held in place by the same screws 21 which join the tubular member 19 and the phenolic plug 20. The use of this hood reduces the possibility of photocell response to ambient light should the subject's thumb be imperfectly placed over the photocell and also helps properly to locate the thumb of a subject relative to the apertures 22, 23.

The photocell 12 is connected in series with a 90 volt battery comprising the heretofore mentioned power source 13 and with the primary winding of the transformer 14 by conductors 30, 31 and 32. A Microtran type MT-6-F transformer having 100,000 ohms primary impedance and 1,200 secondary impedance has been found satisfactory. The secondary winding of the transformer 14 is connected by conductors 33 and 34 through a band pass filter 16 to a direct current amplifier 17. The mid point of the transformer secondary is not used. The filter 16 comprises three condensers 35 and an audio frequency choke 36 connected in parallel and is designed to eliminate signals at frequencies above four or five cycles per second. In the described embodiment of the invention three 100 microfarad 25 WVDC electrolytic capacitors and an inductance of approximately 15 henries were used.

In the embodiment described, a noise free signal of approximately three millivolts measured across a 1,000 ohm load will be present at the input to the amplifier each time the heart beats. During exercise, as the pulse rate increases and the average vascularity of the tissue increases, the amplitude of the pulse signal will increase considerably. An amplifier with a gain of 10,000 at 1 to 3 cycles per second will be sufficient under all conditions. A direct current magnetic amplifier, Doelcam Model 2 HLA-3, having an input impedance of 1,000 ohms in the one millivolt range and an output impedance of 70 ohms was used in the described embodiment.

The amplifier 17 output is connected by conductors 37 and 38 to the input of the recorder 18 or other read-out device. A Brush Model BI 201 single channel recorder has been used in the described embodiment.

In the operation of the invention, the transducer 10 is held by the subject as shown in FIGURE 2 with the pad of the subject's thumb placed over the end of the transducer so as to completely cover the openings 22 and 23 with which the light source 11 and photocell 12, respectively, are associated. The length of flexible conductors 27, 28, 30 and 32 is such that the remainder of the apparatus may be located at some distance from the subject as for example outside a test chamber. With each heart beat, the quantity of blood in the thumb pad increases thereby causing a decrease in the amount of light transmitted through the thumb tissue to the photocell. It should be noted that the light is transmitted through the tissue by scattering since both the light source and the photocell are on the same surface of the thumb pad. The photocell responds to this decrease in the form of a resistive change since the resistance of the cell is an inverse function of the intensity of light falling on its sensitive area. Each time a change in light intensity occurs there is a corresponding change in the resistance of the photocell which in turn causes a change in current created by battery 13 in the photocell circuit. Since the transformer primary winding forms a part of this circuit, the change in current will induce a voltage in the transformer secondary winding in the usual manner. This signal is applied through the band pass filter 16 to the amplifier 17 and, after amplification, to the recorder 18. The recorder output is in the form of a direct or analog trace of the voltage induced in the secondary of the transformer such as is shown in FIGURES 6 and 7.

Pulse rate is determined by counting the number of primary pulse peaks recorded on the chart in a preselected number of chart divisions which are representative of elapsed time. Thus, for example, in the chart portion shown in FIGURE 6, each vertical division on the chart represents one second and the pulse rate indicated by the chart is approximately 105 beats per minute.

The portions of chart shown in FIGURES 6 and 7 demonstrate the clear, unambiguous and continuous trace of pulse rate obtained by means of the present invention. The initial four high peaks or pulse beats in FIGURE 6 were recorded during a period of normal breathing. The remainder of the trace represents pulse beat indications during a period of successive deep breaths which were exhaled immediately. Each of the high peaks represents a pulse beat. FIGURE 7 shows a trace obtained with the present invention from a subject who was holding his breath during the period represented by this chart portion. This trace was made at a higher chart paper speed, such that each vertical division represents one-fifth of a second. The subject's pulse rate can therefore be determined to be approximately 66 beats per minute. In both figures the secondary or lesser peak immediately following the pulse beat represents a secondary pulse beat, a physiological phenomenon known as the dicrotic notch. The amplitude of the secondary pulse is directly related to the respiratory state of the test subject and during periods of heavy exercise will attain nearly the same height as the primary pulse. The base line or reference plane is designated A—A in each instance.

The secondary pulse is clearly distinguishable when the preferred analog read-out is used with the device of the present invention. The analog trace, examples of which are shown in FIGURES 6 and 7, may also yield significant information other than pulse rate concerning the physiological state of a subject. A relatively high dicrotic notch may be the result of a disturbed respiratory state due to physical activity as in the case of test subjects or the result of cardio vascular or respiratory ailments which may be more complex identified by means of more complex standard diagnostic procedures. Thus, the device of the present invention may be used as a gross screening device for the detection of some cardio vascular and respiratory abnormalities.

On the other hand, the virtual elimination of base line shift and extranenous signals in the device of the present invention makes it possible to use electronic counting equipment to monitor and record pulse rates. The amplitude of the primary pulse beat signal may be adjusted by means of the amplifier gain control to an appropriate level to trigger the counting equipment which, in turn, may be adjusted to count only signals exceeding a predetermined amplitude. Since the amplitude of the primary pulse beat will always exceed that of the secondary beat, proper adjustment of amplifier gain and trigger level will permit only the primary pulse beat to be counted even during periods of high physiological stress in the test subject.

The clarity and continuity of the read-out of the present invention may be better understood by comparison of the portion of the chart in FIGURE 6 with the portion of a similar chart shown by H. E. Guttman in "Electronics," September 1959, page 122. The latter chart shows a trace of photoelectrically sensed variations in the light transmission characteristics of tissue and demonstrates base line shift, ambiguous pulse beat indications, and the complete obliteration of a substantial number of pulse beat indications as a result of the increase of oxygen in the blood when the subject took a deep breath. Comparison of this chart with FIGURE 6 representing a chart obtained with the present invention under similar physiological conditions clearly demonstrates the significant improvement in pulse rate measurement afforded by the present invention.

While we have described one embodiment of our invention it will be obvious to those skilled in the art that a number of variations are possible without departing from the scope of our invention. It is, for example, possible to convert the pulse signal into an audio excursion for aural monitoring or the pulse signal can be used to frequency modulate a transmitter for remote monitoring by radio telemetry. It is to be understood, therefore, that the form of the invention herein shown and described is to be taken as a preferred example of the same and that various other changes in the shape, size and arrangement of parts may be resorted to without departing from the spirit of the invention or the scope of the subjoined claims.

We claim:
1. A device for indicating changes in the light transmission characteristics of tissue through which blood is circulated comprising:
   (a) a transducer comprising:
      (1) an opaque member having at least one surface capable of contacting engagement with an area of tissue through which blood is circulated, said surface having apertures therethrough at a position to be completely covered by said area when said surface is brought into contacting engagement therewith,
      (2) a source of light located to direct light rays axially through at least one of said apertures so that said rays impinge upon said area when said surface is brought into contacting engagement therewith, and
      (3) a photoelectric cell responsive to light received through another of said apertures covered by said area when said surface is brought into contacting engagement therewith; and
   (b) a utilization circuit controlled by said photoelectric cell.

2. A transducer responsive to changes in the light transmission characteristics of tissue through which blood is circulated comprising:
   (a) an opaque member having at least one surface conformed for contacting engagement with an area of tissue through which blood is circulated,
   said surface having apertures therethrough at a position to be completely covered by said area when said surface is brought into contacting engagement therewith,
   (b) a source of light located to direct light rays axially of at least one of said apertures so that said rays impinge upon said area when said surface is brought into contacting engagement therewith, and (c) a photoelectric cell responsive to light received through another of the said apertures covered by said area when said surface is brought into contacting engagement therewith.

3. A transducer responsive to changes in the light transmission characteristics of tissue through which blood is circulated comprising:

(a) an opaque housing member conformed readily to be grasped in the hand so as to dispose an exposed surface thereof at one end thereof at a position at which the thumb pad of the thumb of a holder's hand may be brought down into flat contacting engagement with the said end, said surface of said end having apertures therein at a position to be completely covered by the said thumb pad when the housing is held as aforesaid, (b) a source of light located by said member to direct light rays axially of at least one of said apertures so that said rays impinge upon the pad of the thumb covering that one aperture, and (c) a photoelectric cell responsive to light received through another of the said apertures covered by said thumb pad so as to be activated by any light from said source diffusing through the thumb pad of the holder of said transducer between the said apertures.

4. A transducer responsive to changes in the light transmission characteristics of tissue through which blood is circulated comprising:

(a) an elongated tubular member, (b) an opaque member closing one end of said tubular member, said opaque member being provided with at least two apertures therethrough extending generally parallel to the longitudinal axis of said tubular member, (c) means mounted in one of said apertures for conducting light to a surface placed over a closed end of said tubular member, (d) a light source mounted within said tubular member for communication with the inner end of said light conducting means, (e) a photocell mounted within said tubular member to be responsive to light received through the other of said apertures, and (f) flexible means for providing power to said light source and for carrying signals produced by said photocell to a point remote from said transducer.

5. An improved method for indicating the pulse beats of humans and animals which comprises:

(a) diffusing light through one area of tissue through which blood is circulated, (b) detecting at another area of said tissue spaced from said one area variations in light of predetermined wave length diffused through said tissue, (c) converting said variations in light into corresponding electrical signals, and (d) sensibly indicating only that portion of said electrical signals which is representative of pulse beat.

6. An improved method for indicating the pulse beats of humans and animals which comprises:

(a) directing a confined source of light to one confined local area of tissue through which blood is circulated, (b) detecting at another confined local area spaced from said one area variations in light of predetermined wave length diffused through said tissue from said source of light, (c) converting said variations in light into corresponding electrical signals, (d) separating the transient portion of said signals, (e) filtering from said transient portion substantially all signals having frequencies materially in excess of about five cycles per second, (f) amplifying said transient portion, and (g) sensibly indicating said amplified portion.

7. A device for indicating changes in the light transmission characteristics of tissue through which blood is circulated comprising:

(a) a light source capable of diffusing light through tissue, (b) a photoelectric cell capable of producing an electrical signal in response to changes in the amount of light diffused through said tissue, (c) an alternating current transformer having its primary winding connected in series with said photoelectric cell, (d) a filter circuit capable of blocking any electrical signal having a frequency materially in excess of the maximum frequency of the change in the light transmission characteristics of tissue to be indicated by said device, the input of said filter circuit being connected to the secondary winding of said transformer, (e) an electrical signal amplifier having its input connected to the output of said filter circuit, and (f) electrical signal indicating means connected to the output of said amplifier.

8. A device for indicating changes in the light transmission characteristics of tissue through which blood is circulated comprising:

(a) a light source capable of diffusing light through tissue, (b) a photoelectric cell capable of producing an electrical signal in response to changes in the amount of light diffused through said tissue, said photoelectric cell being capable of providing a maximum response to light having a wave length of from about 7,100 to about 7,500 angstroms, (c) an alternating current transformer having its primary winding connected in series with said photoelectric cell, (d) an electrical signal amplifier having its input connected to the secondary winding of said transformer, and (e) an electrical signal indicating means connected to the output of said amplifier.

9. A device for indicating changes in the light transmission characteristics of tissue through which blood is circulated comprising:

(a) a light source capable of diffusing light through tissue, (b) a photoelectric cell capable of producing an electrical signal in response to changes in the amount of light diffused through said tissue, said photoelectric cell being capable of providing a maximum response to light having a wave length from about 7,100 to about 7,500 angstroms, (c) an alternating current transformer having its primary winding connected in series with said photoelectric cell, (d) a filter circuit capable of blocking any electrical signal having a frequency materially in excess of the maximum frequency of the change in the light transmission characteristics of tissue to be indicated by said device, the input of said filter circuit being connected to the secondary winding of said transformer, (e) an electrical signal amplifier having its input connected to the output of said filter circuit, and (f) electrical signal indicating means connected to the output of said amplifier.

10. A device for indicating changes in the light transmission characteristics of tissue through which blood is circulated comprising:

(a) a light source capable of diffusing light through tissue, (b) a photoelectrical cell capable of producing an electrical signal in response to changes in the amount of light diffused through said tissue, said photoelectric cell being capable of providing a maximum response to light having a wave length of from about 7,100 to about 7,500 angstroms, (c) an alternating current transformer having its primary winding connected in series with said photoelectric cell, (d) a filter circuit capable of blocking any electrical signal having a frequency materially in excess of about five cycles per second, the input of said filter circuit being connected to the secondary winding of said transformer, (e) an electrical signal amplifier having its input connected to the output of said filter circuit, and (f) electrical signal indicating means connected to the output of said amplifier.

11. A device for indicating changes in the light transmission characteristics of tissue through which blood is circulated comprising:

(a) a light source capable of diffusing light through tissue, (b) a photoelectric cell capable of producing an electrical signal in response to changes in the amount of light diffused through said tissue, (c) a transducer comprising:
  (1) a housing having a tissue-contacting surface, said surface having at least two apertures therethrough,
  (2) means for mounting said light source within said housing member to direct light through one of said apertures to the face of said surface, and
  (3) means for mounting said photoelectric cell within said housing so as to be responsive to light received through another of said apertures, (d) an alternating current transformer having its primary winding connected in series with said photoelectric cell, (e) a filter circuit capable of blocking any electrical signal having a frequency materially in excess of about five cycles per second, the input of said filter circuit being connected to the secondary winding of said transformer, (f) an electrical signal amplifier having its input connected to the output of said filter circuit, and (g) electrical signal indicating means connected to the output of said amplifier.

References Cited in the file of this patent

UNITED STATES PATENTS

| | | |
|---|---|---|
| 3,040,737 | Kompelien | June 26, 1962 |
| 3,051,165 | Kompelien | Aug. 28, 1962 |